United States Patent
Mendonsa et al.

(10) Patent No.: US 11,748,272 B2
(45) Date of Patent: Sep. 5, 2023

(54) SHARED KEYS FOR NO PCBA CARTRIDGES

(71) Applicant: Seagate Technology LLC, Fremont, CA (US)

(72) Inventors: Riyan Alex Mendonsa, Edina, MN (US); Yasaman Keshtkarjahromi, Shakopee, MN (US); Josip Relota, Saratoga, CA (US); Vipin Singh Sehrawat, Fremont, CA (US)

(73) Assignee: SEAGATE TECHNOLOGY, LLC, Fremont, CA (US)

( * ) Notice: Subject to any disclaimer, the term of this patent is extended or adjusted under 35 U.S.C. 154(b) by 0 days.

(21) Appl. No.: 17/308,882

(22) Filed: May 5, 2021

(65) Prior Publication Data

US 2022/0358053 A1   Nov. 10, 2022

(51) Int. Cl.
*G06F 12/14*   (2006.01)
*H04L 9/08*   (2006.01)

(52) U.S. Cl.
CPC ........ *G06F 12/1408* (2013.01); *H04L 9/0816* (2013.01); *G06F 2212/1052* (2013.01)

(58) Field of Classification Search
None
See application file for complete search history.

(56) References Cited

U.S. PATENT DOCUMENTS

| | | |
|---|---|---|
| 7,162,645 B2 | 1/2007 | Iguchi et al. |
| 7,489,510 B1 | 2/2009 | Hung et al. |
| 7,945,788 B2 * | 5/2011 | Roberts .................. G06F 21/79 713/168 |
| 8,527,780 B2 | 9/2013 | Roberts et al. |
| 8,775,825 B2 * | 7/2014 | Klum .................... G06F 21/10 713/189 |

(Continued)

FOREIGN PATENT DOCUMENTS

| | | |
|---|---|---|
| CN | 101784993 A | 7/2010 |
| CN | 102687157 A | 9/2012 |
| TW | 578049 B | 3/2004 |

OTHER PUBLICATIONS

Office Action and Search Report issued by the China National Intellectual Property Administration dated Mar. 3, 2021 for Patent Application 202010305755.8.

*Primary Examiner* — Sanchit K Sarker
(74) *Attorney, Agent, or Firm* — HOLZER PATEL DRENNAN

(57) ABSTRACT

In at least one implementation, technology disclosed herein provides a method including generating a plurality of shares of an encryption key such that a combination of shares having a cardinality above a threshold cardinality is sufficient to retrieve data encrypted with the encryption key, distributing the plurality of shares among a plurality of devices, the plurality of devices including one or more disc drive cartridges and one or more printed circuit board assemblies (PCBAs) configured to host one or more of the disc drive cartridges, receiving one or more of the plurality of shares from the plurality of devices, and in response to determining that cardinality of the received one or more of the plurality of shares is above the threshold cardinality, retrieving the data encrypted with the key.

19 Claims, 7 Drawing Sheets

(56) References Cited

U.S. PATENT DOCUMENTS

| | | | |
|---|---|---|---|
| 8,949,626 B2* | 2/2015 | Asnaashari | G06F 21/78 |
| | | | 713/193 |
| 9,904,777 B2 | 2/2018 | Mark | |
| 10,776,010 B1 | 9/2020 | Mendonsa et al. | |
| 10,818,318 B2 | 10/2020 | Herdendorf et al. | |
| 11,063,754 B2* | 7/2021 | Vakili | H04L 9/0825 |
| 2005/0177754 A1 | 8/2005 | Pezeshk | |
| 2010/0289627 A1* | 11/2010 | McAllister | H04L 9/3226 |
| | | | 340/10.42 |
| 2015/0244522 A1* | 8/2015 | Cheruvath | G06F 21/31 |
| | | | 713/183 |
| 2019/0342080 A1* | 11/2019 | Vakili | H04L 9/0897 |
| 2020/0272367 A1 | 8/2020 | Mendonsa et al. | |
| 2020/0320226 A1 | 10/2020 | Chitrak Gupta et al. | |
| 2020/0393966 A1 | 12/2020 | Mendonsa et al. | |

* cited by examiner

Case I

Case IV

US 11,748,272 B2

SHARED KEYS FOR NO PCBA CARTRIDGES

BACKGROUND

As global storage needs keep increasing, and the needs for archival storage increase, the need for alternative technologies and cost reduction over the lifetime of the data stored are important. The current hard disc drive (HDD) has opportunities for further cost reduction, both in initial cost and cost over lifetime. One such cost saving being explored is separating the printed circuit board assembly (PCBA) on which the HDD is configured from the HDD cartridge. This separates the PCBA from the HDD, which also separates the cryptographic key from the HDD.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

In at least one implementation, technology disclosed herein provides a method including generating a plurality of shares of an encryption key such that a combination of shares having a cardinality above a threshold cardinality is sufficient to retrieve data that can be decrypted with the key distributing the plurality of shares among a plurality of devices, the plurality of devices including one or more disc drive cartridges and one or more printed circuit board assemblies (PCBAs) configured to host one or more of the disc drive cartridges, receiving one or more of the plurality of shares from the plurality of devices, and in response to determining that cardinality of the received one or more of the plurality of shares is above the threshold cardinality, retrieving the key.

BRIEF DESCRIPTION OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTIONS

Figure 1:
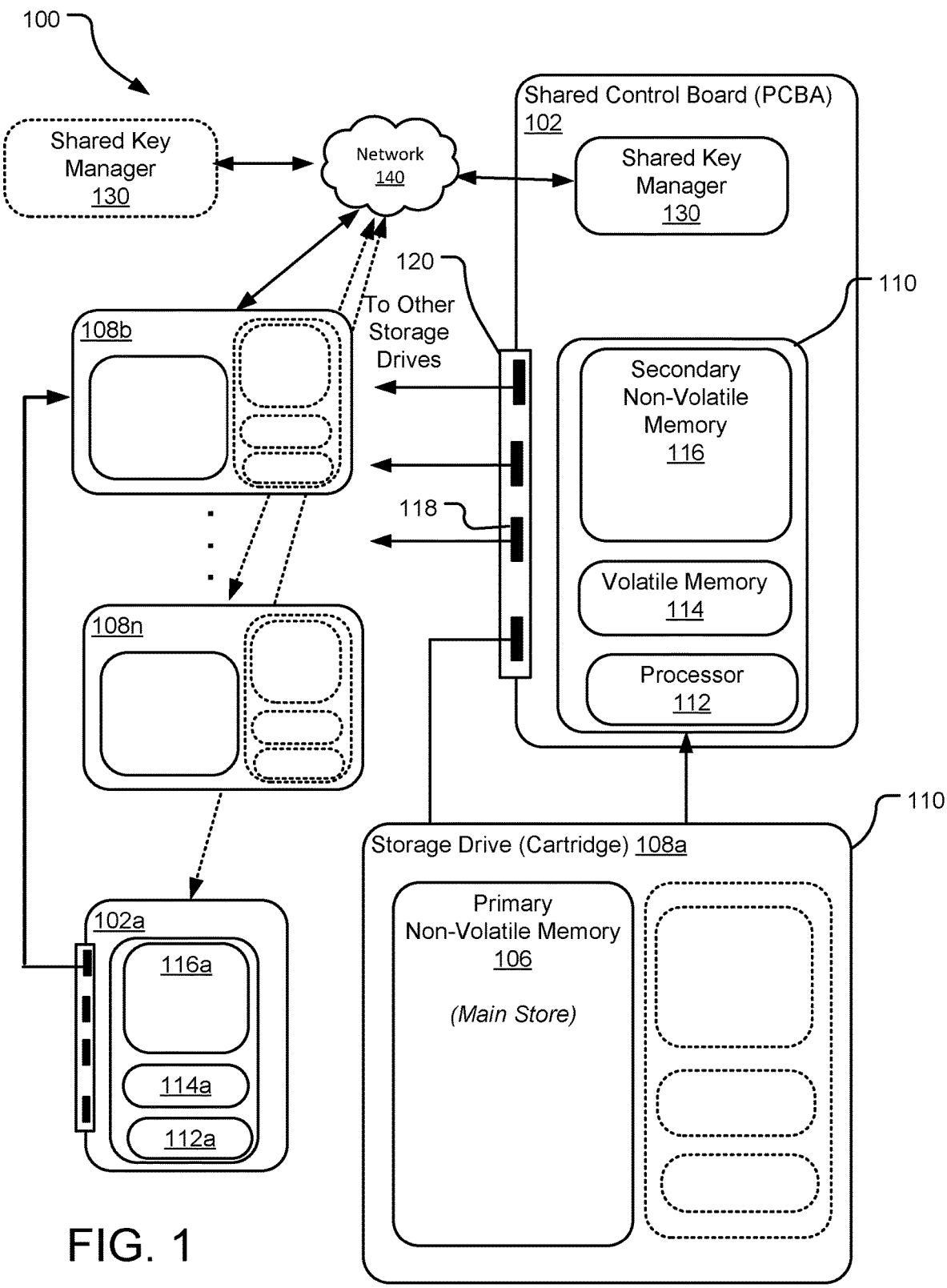
FIG. 1 illustrates an exemplary storage system including a plurality of storage drives that share a printed circuit board assembly (PCBA) for one or more resources.

The technology disclosed herein generally relates to security and encryption in implementations of storage devices where the PCBAs are separated from the cartridges including disc drives. Specifically, the implementations disclosed herein provides method for secret sharing keys for generating distributed keys among cartridges and the PCBAs such that each has a share of the key and a minimum number of shares are required to reconstruct the key and to retrieve the data encrypted with the key. In one example implementation, any subset of cartridges and players with cardinality equal to or greater than the threshold number can reconstruct the key by pooling together their shares.

Some secure data storage devices include control circuitry for encrypting user data during data writes and/or decrypting such data during reads. For example, a secure storage drive may prohibit read/write access until a user provides a pin (public key) that the storage drive has associated in memory with the encryption key (private key). Responsive to successful authentication of the pin, the control circuitry accesses the encryption key for using encryption and decryption during host-initiated read and write operations.

A secure storage device typically stores an encryption key somewhere other than the device's primary storage media, since the data on the primary media is itself encrypted with the key. The encryption key may, for example, be stored in non-volatile memory accessible by the device's read/write control system or within a hardware register of the read/write control system. In the example of a hard drive disk assembly (HDA), the encryption key may be stored within the HDA's system-on-chip (SoC), which functions as the read/write control system. The SoC is traditionally located on a printed circuit board assembly (PCBA) within the drive. In many of the systems disclosed herein, data is stored on portable storage cartridges that lack the PCBA, SoC, and independent read/write control electronics.

The term "storage cartridges" is used herein to refer to an exemplary type of portable storage drive lacking an independent set of read/write controls. By example and without limitation, the exemplary storage cartridges described herein are shown to resemble conventional hard drive disks (HDD) but without certain mechanical and electrical features that would otherwise be necessary to enable the cartridge to operate in a stand-alone fashion. Each storage cartridge may, for example, generally assume the form of an HDD minus control electronics and, in some cases, other elements that can be offloaded from the cartridge and supplied by the actuated media player, such as VCM magnets and spindle motor components. The removal of these elements from the individual cartridges in the library allows the provisioning of a large-scale, high-capacity storage system with the benefits of magnetic disc storage at a significantly lower cost. In some implementations, the storage cartridges in the secure cartridge-based storage system may include SSD-based storage media with read/write control electronics removed to the associated media player(s).

The growing use of cloud-based storage solutions has driven demand for low-cost data storage systems capable of retaining large volumes of data. In recent years, this demand has driven development of storage solutions with read/write control systems that are shared between groups of hot-swappable drives. In these systems, some or all of the read/write control electronics traditionally included within each individual drive may be displaced from the drive's enclosure to a shared control board with an interconnect that couples the read/write control electronics to several different drives. These read/write control electronics located on the shared control board may generate the read/write control signals to control data access to each of multiple drives.

Some of these systems with centralized, shared read/write controls have a shared "control board" that is designed to removably couple to individual drives that individually lack memory and secondary storage traditionally used to store secure drive encryption keys. When these resources (e.g., the read/write control system) are displaced from individual drive enclosures to locations where they are instead shared by multiple drives, challenges arise relating to where a drive-specific encryption key may be stored without creating data security vulnerabilities. Storage cartridges may be used in cold storage market, where the device for the storage and access to the cartridges are likely be an archival library system. Such archival library system may have the PCBA and drive electronics as part of the archival library system, wherein the enclosure with the PCBA and drive electronics goes into a rack.

FIG. 1 illustrates an exemplary storage system 100 including a plurality of storage drives that share a printed circuit board assembly (PCBA) for one or more resources. Specifically, storage drives 108 (108a, . . . 108n) disclosed herein lack traditional storage and processing resources utilized to access (read data from or write data to) a primary non-volatile memory 106 within an enclosure of the storage drives 108. The primary non-volatile memory 106 may include one or more types of non-volatile storage media including, for example, magnetic disks, optical drives, flash, etc. Data blocks within the primary non-volatile storage memory 106 may collectively comprise a "main store," which refers to a collection of physical data blocks mapped to a range of logical block addresses (LBAs) utilized by a host device when reading and writing data to the data storage device.

The storage drives 108 are coupled to a printed circuit board assembly (PCBA) or a shared control board 102 that includes read/write control electronics 110 for generating the read and write signals to access the primary non-volatile memory 106 as well as the read and write signals for accessing primary non-volatile memory within the storage drives 108 that are also coupled to the shared control board 102 through various ports (e.g., a port 118) in an interconnect 120.

Furthermore, while in the illustrated implementation, one shared control board 102 accesses multiple storage drives, in alternative implementations, multiple control boards may be able to access each of the storage drives 108. Thus, for example, the storage drive 108b may be accessed by both the shared control board 102 and a shared control board 102a.

Although the specific read/write control electronics 110 included on the shared control board 102 may vary from one implementation to another, the read/write control electronics of FIG. 1 include at least a processor 112, volatile memory 114 (e.g., DRAM), and a secondary non-volatile memory 116 (e.g., Flash). As indicated by dotted lines within the storage drive 108, the read/write control electronics 110 represent a collection of electronics traditionally included within an enclosures of the storage drives 108 that have, in FIG. 1, been displaced to the shared control board 102.

In traditional storage drives where the shared electronics 110 is on a storage drive the shared electronics may provide various security features such as secure erase, encryption of the firmware for the storage drive, etc. These security features maybe controlled by a cryptographic key residing on the control electronics of the storage device. However, in the given implementation, where the storage drives 108 do not have their own control electronics the cryptographic key for the storage drives 108 is separate from the storage drives 108 as it may reside on the shared electronics 110. Therefore, controlling the security features on the storage drives 108 becomes an issue.

The implementations disclosed herein provides a secret sharing solution for generating distributed keys among the storage drives 108 and the shared control boards 102. In one implementation, one or more of the shared control boards 102, also referred to as players 102, and one or more of the storage drives 108, referred to as cartridges 108, may have a share of the cryptographic key for accessing security features. Specifically, a combination of devices may use the shares of the cryptographic key to reconstruct the key, which may in turn be used to retrieve the data that can be decrypted with the key.

The shared control board 102 may include a shared key manager 130 that manages the generating and distribution of keys among various players and cartridges. While the illustrated implementation has the shared key manager 130 implemented on one of the shared control boards 102, in an alternative implementation, the shared key manager 130 may be implemented on a server separate from the shared control boards 102 and the cartridges 108. Specifically, such server may be communicatively connected with the shared control boards 102 and the cartridges 108 via a network 140, such as the Internet.

The shared key manager 130 may be configured to generate shares of a key for each of the shared control boards 102 and the cartridges 108 and to reconstruct the key based on the shares of the key received from one or more of the shared control boards 102 and the cartridges 108. In one implementation, the shared key manager 130 may be configured to use a threshold secret sharing method for giving access to a secret to a combination of the shared control boards 102 and the cartridges 108 based on comparing an aggregation of the received shares from the shared control boards 102 and the cartridges 108 with a threshold.

Alternatively, the shared key manager 130 may use alternative aggregation schemes, such as a polynomial secret sharing scheme, which uses the fact that at least k points are required to define a polynomial of degree k−1. Alternatively, the secret sharing scheme used by the shared key manager 130 may be a linear secret sharing where the secret can be reconstructed as the linear combination of enough number of shares. For example, in one implementation, where the threshold secret sharing is based on an algebraic aggregation, the shared key manager 130 may add the shares received from the combination of shared control boards 102 and the cartridges 108 with a threshold and if the number of the shares is at or above the threshold, the shared key manager 130 gives access to the shared secret to any combination of the shared control boards 102 and the cartridges 108. Yet alternatively, other approaches, such as the Blakeley's scheme, the Chinese remainder theorem, etc., may also be used as secret sharing schemes.

Yet alternatively, in some implementations, a combination of secret sharing schemes may also be used under the condition that only the devices receiving shares using the same scheme can be combined. Thus, a combination of devices can be provided access to the shared secret if it meets a threshold or if it meets the condition of the Blakely's scheme. Alternatively, a combination of devices can be provided access to the shared secret if it meets a threshold or if it meets the condition of the Chinese remainder theorem. However, in this implementation, the device with the share from Blakely's scheme cannot be used in combination of the device with the share from Chinese remainder scheme.

Figure 2:
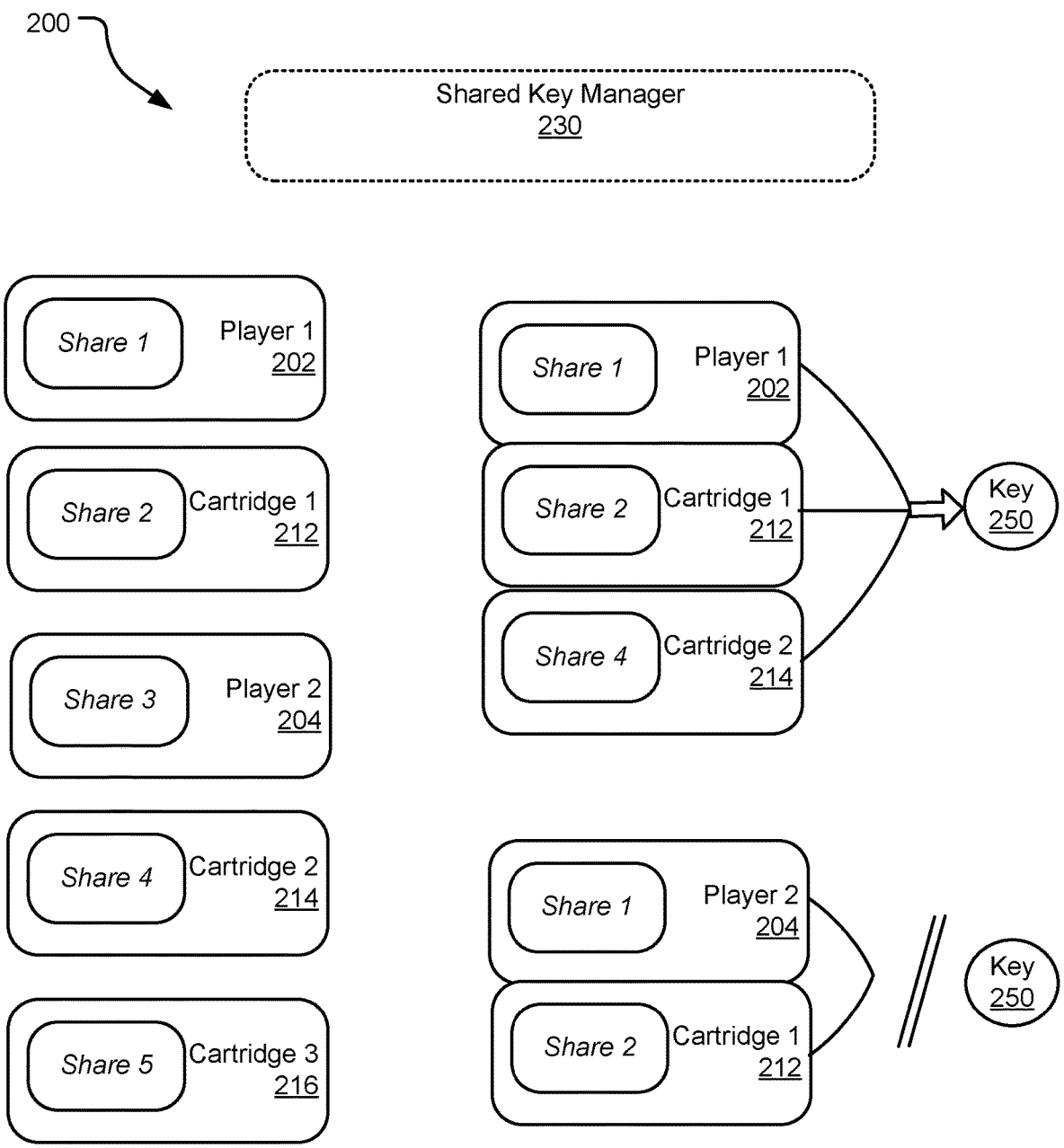
FIG. 2 illustrates an example implementation of the secret sharing scheme among a number of cartridges with different shares of a key.

FIG. 2 illustrates an example implementation of the secret sharing scheme 200 among a number of cartridges with different shares of a key. Specifically, FIG. 2 illustrates a shared key manager 230 working with a number of players 202, 204 and cartridges 212, 214, 216 to implement a secret sharing scheme for reconstructing a key for accessing a secret. Specifically, the secret sharing scheme 200 is a threshold secret sharing scheme where the threshold to reconstruct a key is three (3).

In the illustrated implementation, each of the players 202, 204 and cartridges 212, 214, 216 is given one (1) share of the key. A combination of the players 202, 204 and cartridges 212, 214, 216 may request access to a key 250. The shared key manager 230 compares the aggregate shares of the requesting devices and compares it to the threshold. Thus, as an example, if a combination of player 1 202, cartridge 1 212, and cartridge 2 214 requests access to the shared secret, the aggregation of the shares of these three devices—which is three (3)—meets the threshold and therefore, the shared key manager reconstructs the key 250. An alternative solution is that each of the player 1 202, cartridge 1 212, and cartridge 2 214, sends its share to the other two, e.g., via the network 140, and in this way, each of the three devices can reconstruct the key individually. Subsequently, these devices, namely the player 1 202, cartridge 1 212, and cartridge 2 214 can use the reconstructed key 250 to get access to a secret that may be used to access one or more security features, such as firmware encryption, etc.

On the other hand, if a combination of player 1 204 and cartridge 1 212 requests access to the key 250, the combination of their shares being two (2), which is below the required threshold, the shared key manager 230 prevents them from accessing the key 250. As a result, the combination of player 1 204 and cartridge 1 212 is unable to get access to the shared secret and therefore to access any security features.

Figure 3:
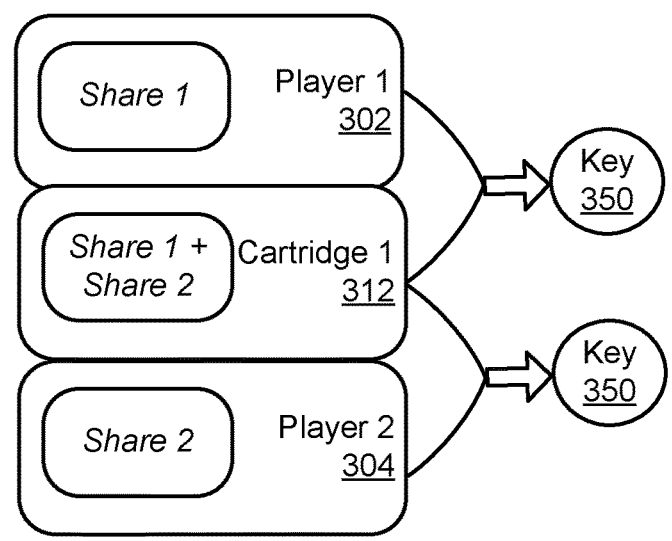
FIG. 3 illustrates an alternative example implementation of the secret sharing scheme among a number of cartridges and players with different shares of a key.

FIG. 3 illustrates an alternative example implementation of the secret sharing scheme 300 among a number of cartridges with different shares of a key. Specifically, this implementation describes a case (case I) where a cartridge is transported to a different but known player (such as a PCB with shared electronics, a DVD player, etc.).

In this case, if both player 1 302 and player 2 304 are known, and the shares of keys are preassigned to them, then the share of the key may be assigned to the cartridge 312 such that any one of the players 302 or 304 can read the data from the cartridge 312. Specifically, the cartridge 1 312 is assigned the share, such that combination of player 1 302 and cartridge 1 312 results in aggregation of the two shares of the key, i.e., Share 1 and Share 2, which meets the threshold requirement to get access to the key 350. Similarly, the combination of player 2 304 and cartridge 1 312 also results in aggregation of two shares and meets the threshold requirement to get access to the key 350.

Figure 4:
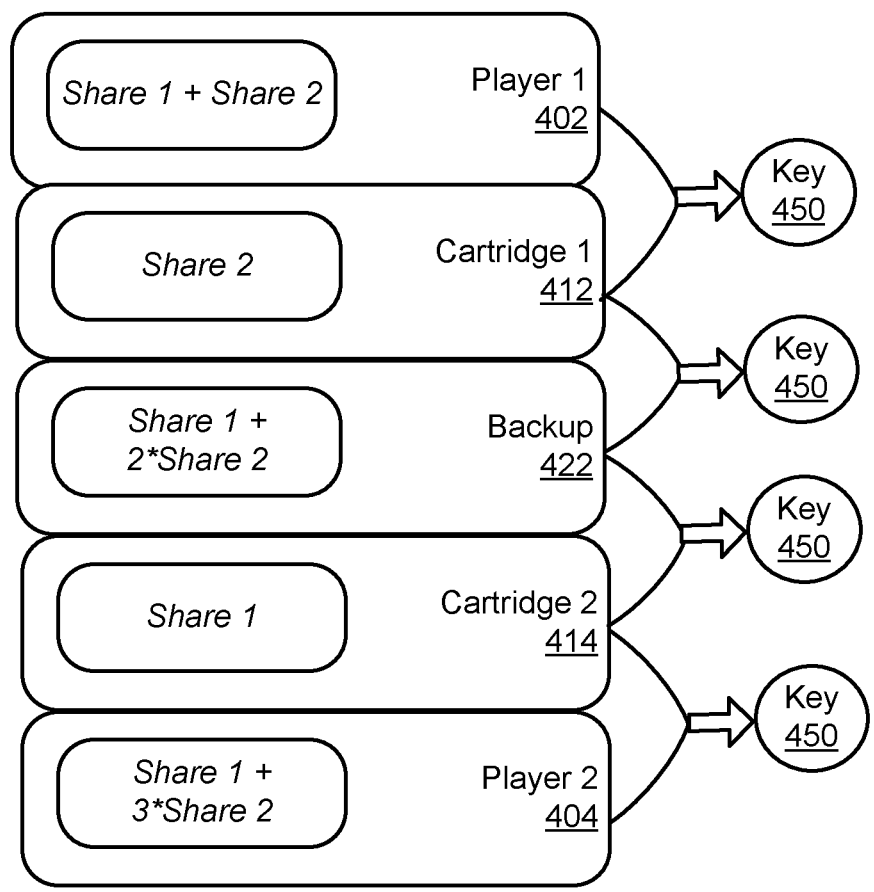
FIG. 4 illustrates an alternative example implementation of the secret sharing scheme among a number of cartridges and players with different shares of a key.

FIG. 4 illustrates an alternative example implementation of the secret sharing scheme 400 among a number of cartridges with different shares of a key. Specifically, this implementation describes a case (case II) where a backup player 422 can be used for both player 1 402 and the player 2 404. This case allows replacement of a player with a backup player.

Thus, as shown in FIG. 4, the backup player 422 is able to combine its shares with the shares of cartridge 1 to get access to key as well combine its shares with the shares of cartridge 2 to access the key. Thus, the backup player is allocated shares so that it can access security features and data on both cartridges. For more players, a linearly independent combination of n*Share1+m*Share2, where n and m are variables known to the player, can be used as the shares for the player.

In another case (case III), If a cartridge is lost or needs to be replaced, in the setup here, at least 2 players need to be brought together to reconstruct the key. Alternatively, a host system (which has at least one similar secret sharing shard as a player) can be designated as another player and be used to configure a share for a new cartridge.

Figure 5:
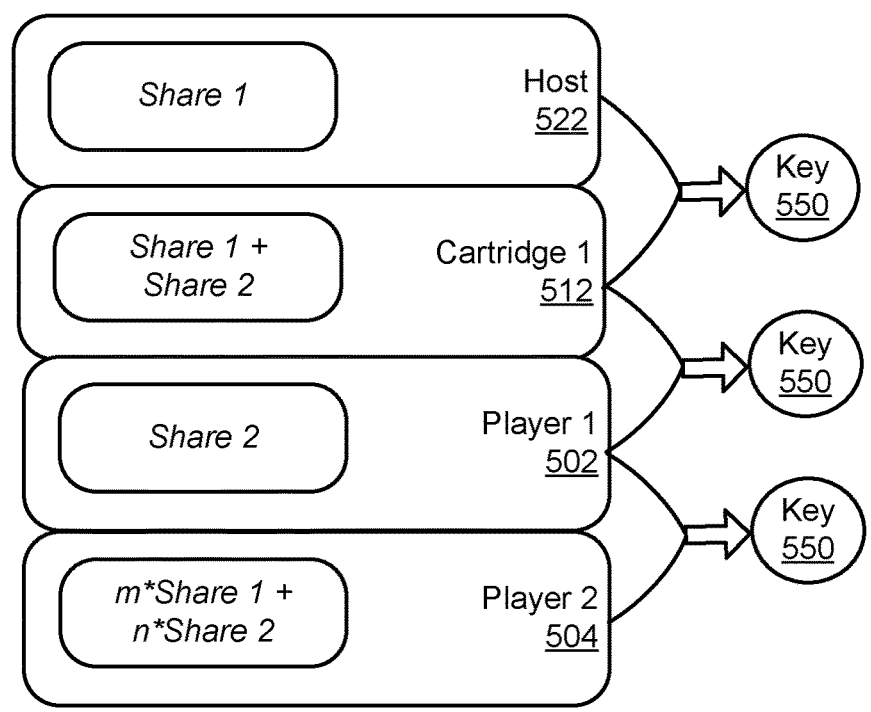
FIG. 5 illustrates an alternative example implementation of the secret sharing scheme among a number of cartridges and players with different shares of a key.

FIG. 5 illustrates an alternative example implementation of the secret sharing scheme 500 among a number of cartridges with different shares of a key. Specifically, this implementation describes a case (case IV), similar to case III discussed above, where a host, player and cartridge is part of the secret sharing network and therefore enables collaboration among players/host to provide sufficient shares for the cartridge to be read. Specifically, the host may enable key management to match the right keys.

Figure 6:
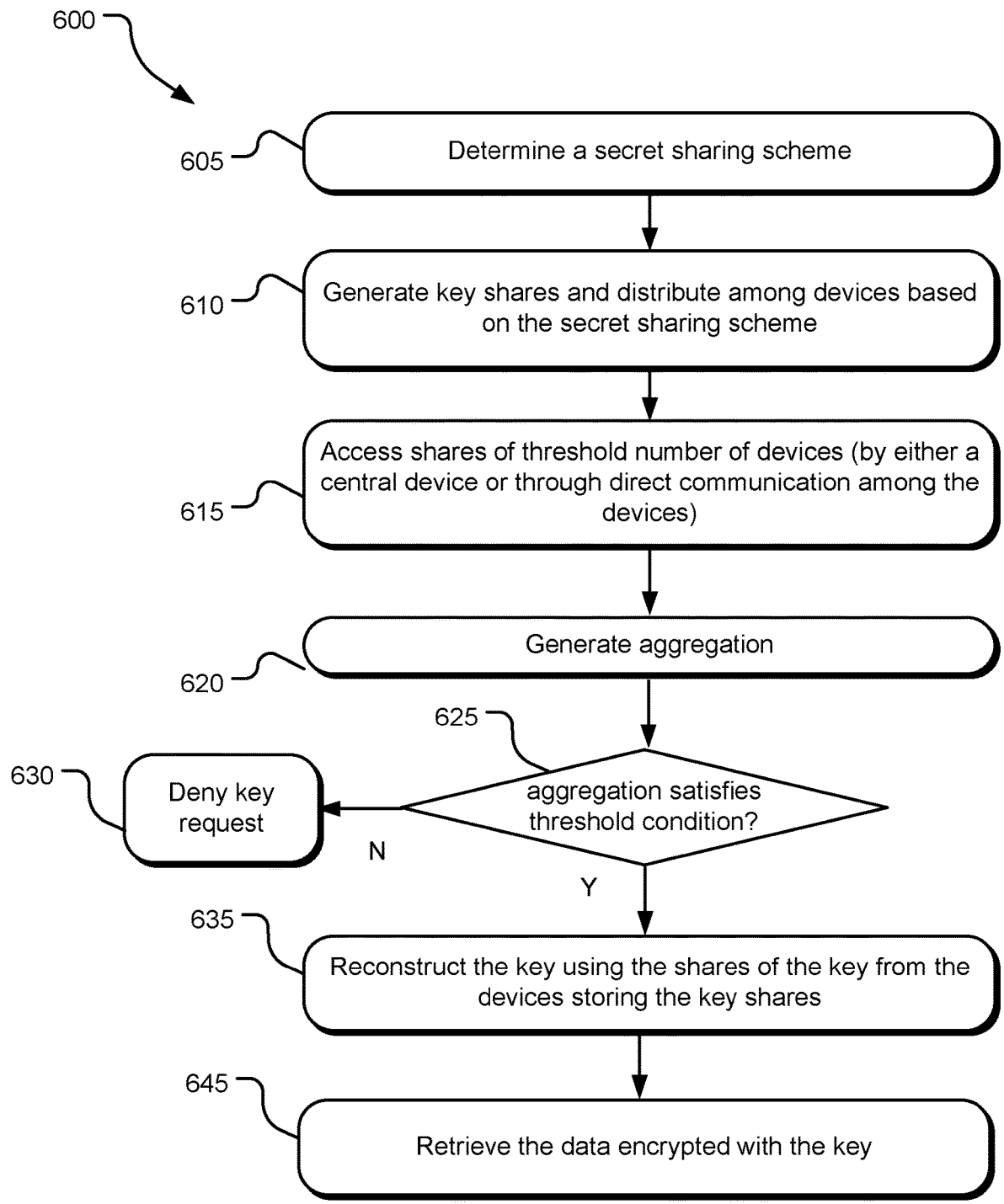
FIG. 6 illustrates example operations of a system disclosed herein for retrieving data based on threshold shares of keys.

FIG. 6 illustrates example operations 600 of a system disclosed herein for retrieving a secret based on threshold shares of keys. At operation 605, a secret sharing scheme is determined. For example, the operation 605 may determine that a linear threshold secret sharing scheme is to be used. Subsequently, an operation 610 generates key shares and distributes among devices based on the secret sharing scheme determined at operation 605.

At operation 615, a central device that has access to a threshold number of devices (e.g. two devices) with the shares accesses these shares or the devices (e.g. two devices) share their shares directly with each other w/o the presence of a central device. An operation 625 compares aggregation of the shares with a threshold. If the aggregation of the shares does not meet the threshold condition, an operation 630 denies the request from the requesting combination of players and cartridges. If the aggregation of the shares meets the threshold condition, an operation 635 reconstructs the key using the shares of the key from the devices storing the key shares. An operation 645 may use the reconstructed key to retrieve the data encrypted with the key.

While the examples shown above show systems with n devices and minimum threshold of two (2) shares needed to determine the secret (except for FIG. 2, where the minimum threshold of required shares is three), it does not need to be limited to two (2) shares and can be more. For example, in an implementation where the cartridges are tied together in a magazine format and have their own unique shares, if a magazine contains 5 cartridges, then a threshold can be set to 6, which may be satisfied by one (1) player and five (5) cartridges. In this way, if an external device has access to the whole magazine, it cannot reconstruct the key due to insufficient number of shares. Furthermore, while the above examples show a linear secret sharing schemes, any other secret sharing scheme such as a polynomial sharing scheme can also be used.

In alternative example implementations, the (public/private) share(s) of the players and the cartridges may be stored in a non-volatile memory which is either written to once during manufacturing or multiple times to allow for repurposing drives (secure erase). Furthermore, for each of the methods, other information in addition to a public/private keys/shares may be stored in non-volatile memory such as a unique device ID number to that may be queried by the storage system to facilitate means of a table lookup and key/share authentication. Furthermore, the cartridges used herein do not need to be limited to HDD based cartridges, but any other type of storage cartridge may also be employed.

Figure 7:
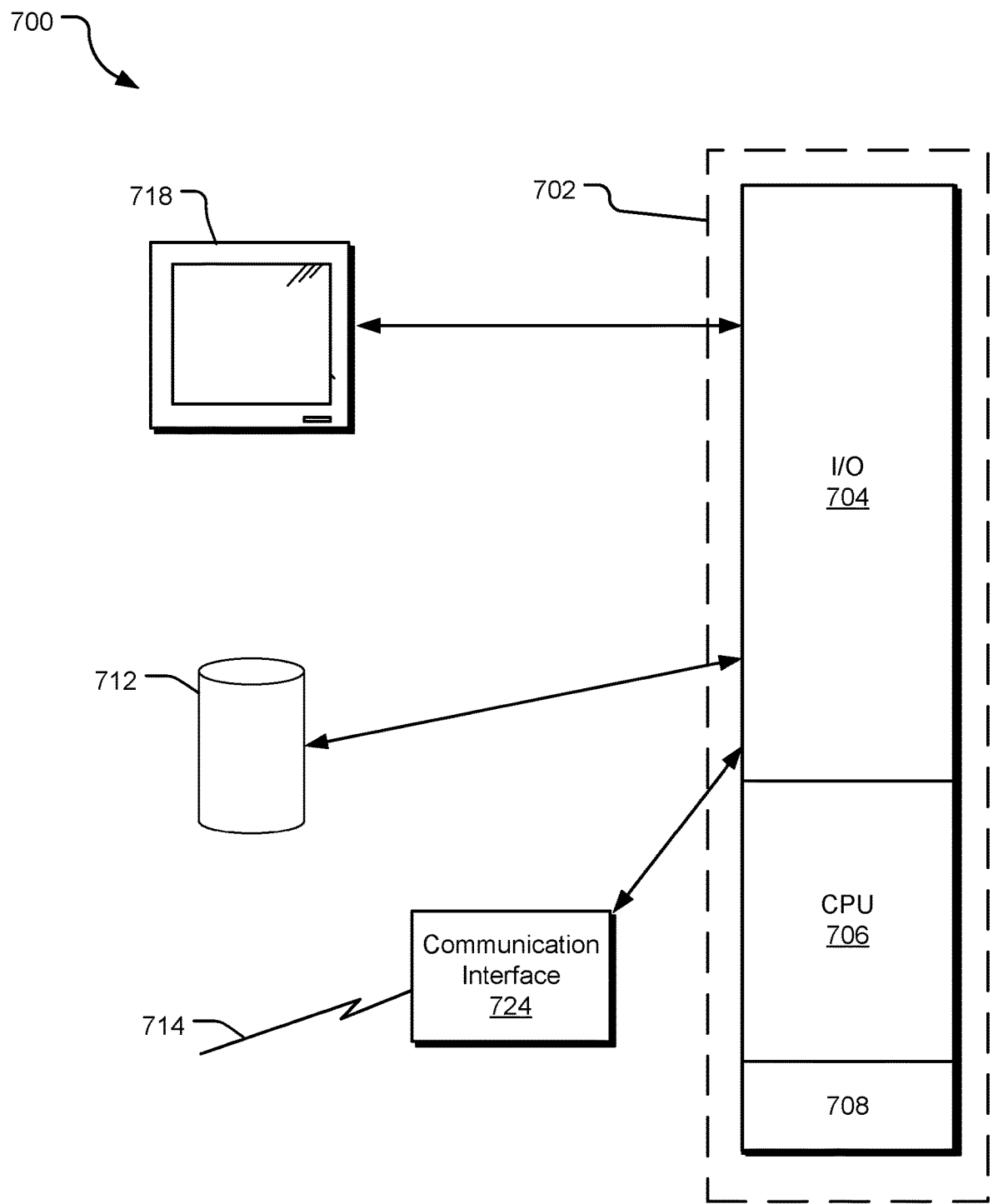
FIG. 7 illustrates an example computing system that may be used to implement the technology disclosed herein.

FIG. 7 illustrates an example processing system 700 that may be useful in implementing the described technology. The processing system 700 is capable of executing a computer program product embodied in a tangible computer-readable storage medium to execute a computer process. Data and program files may be input to the processing system 700, which reads the files and executes the programs therein using one or more processors (CPUs or GPUs). Some of the elements of a processing system 700 are shown in FIG. 7 wherein a processor 702 is shown having an input/output (I/O) section 704, a Central Processing Unit (CPU) 706, and a memory section 708. There may be one or more processors 702, such that the processor 702 of the processing system 700 comprises a single central-processing unit 706, or a plurality of processing units. The processors may be single core or multi-core processors. The processing system 700 may be a conventional computer, a distributed computer, or any other type of computer. The described technology is optionally implemented in software loaded in memory 708, a storage unit 712, and/or communicated via a wired or wireless network link 714 on a carrier signal (e.g., Ethernet, 3G wireless, 8G wireless, LTE (Long Term Evolution)) thereby transforming the processing system 700 in FIG. 7 to a special purpose machine for implementing the described operations. The processing system 700 may be an application specific processing system configured for supporting a distributed ledger. In other words, the processing system 700 may be a ledger node.

The I/O section 704 may be connected to one or more user-interface devices (e.g., a keyboard, a touch-screen display unit 718, etc.) or a storage unit 712. Computer program products containing mechanisms to effectuate the systems and methods in accordance with the described technology may reside in the memory section 708 or on the storage unit 712 of such a system 700.

A communication interface 724 is capable of connecting the processing system 700 to an enterprise network via the network link 714, through which the computer system can receive instructions and data embodied in a carrier wave. When used in a local area networking (LAN) environment, the processing system 700 is connected (by wired connection or wirelessly) to a local network through the communication interface 724, which is one type of communications device. When used in a wide-area-networking (WAN) environment, the processing system 700 typically includes a modem, a network adapter, or any other type of communications device for establishing communications over the wide area network. In a networked environment, program modules depicted relative to the processing system 700 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 708 and/or the storage unit 712 and executed by the processor 702. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 708 and/or the storage unit 712 and executed by the processor 702.

The processing system 700 may be implemented in a device, such as a user device, storage device, IoT device, a desktop, laptop, computing device. The processing system 700 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
   generating a plurality of shares of an encryption key;
   aggregating the plurality of shares used to access a secret to a combination of shared printed circuit board assemblies (PCBAs) and disc drive cartridges based on comparing the aggregation of plurality of shares received from the combination of shared PCBAs and disc drive cartridges with a threshold number, the threshold number providing a combination of a threshold number of disc drive cartridges and a threshold number of PCBAs, wherein aggregating the plurality of shares being an algebraic aggregation;
   distributing the plurality of shares among a plurality of devices, the plurality of devices including one or more of the disc drive cartridges and the PCBAs configured to host the one or more of the disc drive cartridges;
   receiving, at a hardware controller, one or more of the plurality of shares from the plurality of devices; and
   in response to determining that the aggregation of the received one or more of the plurality of shares is above the threshold number, reconstructing the encryption key using the received one or more of the plurality of shares from the plurality of devices to retrieve data encrypted with the encryption key.

2. The method of claim 1, further comprising retrieving data encrypted with the key using the reconstructed encryption key.

3. The method of claim 1, wherein the key is a linear function of the plurality of the shares.

4. The method of claim 1, wherein distributing the plurality of shares among the plurality of devices further comprising distributing the plurality of shares among k of the plurality of devices wherein k shares are required to define a polynomial of degree k−1.

5. The method of claim 1, wherein distributing the plurality of shares among a plurality of devices further comprising distributing the plurality of shares among the plurality of devices based on Blakeley's scheme.

6. The method of claim 1, wherein distributing the plurality of shares among a plurality of devices further comprising distributing the plurality of shares among the plurality of devices based on Chinese remainder theorem.

7. The method of claim 1, wherein distributing the plurality of shares among a plurality of devices further comprises distributing shares of at least two PCBAs to a common cartridge so that each of the at least two PCBAs in combination with the common cartridge is able to reconstruct the encryption key.

8. The method of claim 1, wherein distributing the plurality of shares among a plurality of devices further comprises distributing shares of at least two cartridges to a backup PCBA so that the backup PCBA in combination with the one of at least two cartridges is able to reconstruct the encryption key.

9. The method of claim 1, wherein distributing the plurality of shares among a plurality of devices further comprises distributing at least one share to a host so that the host in combination with at least one player is able to reconstruct the encryption key.

10. The method of claim 1, wherein distributing the plurality of shares among a plurality of devices further comprises distributing a share to a host, a PCBA, and one or more players.

11. A system comprising:
    a hardware controller removably coupled to a storage drive including a primary storage, the hardware controller configured to:
    generate a plurality of shares of an encryption key;
    aggregate the plurality of shares used to access a secret to a combination of shared printed circuit board assemblies (PCBAs) and disc drive cartridges based on comparing the aggregation of plurality of shares received from the combination of shared PCBAs and disc drive cartridges with a threshold number, the threshold number providing a combination of a threshold number of disc drive cartridges and a threshold number of PCBAs, wherein aggregating the plurality of shares being an algebraic aggregation;
    distribute the plurality of shares among a plurality of devices, the plurality of devices including one or more of the disc drive cartridges and the PCBAs configured to host the one or more of the disc drive cartridges;
    receive one or more of the plurality of shares from the plurality of devices; and
    in response to determining that the aggregation of the received one or more of the plurality of shares is above the threshold number, reconstruct the encryption key using the received one or more of the plurality of shares from the plurality of devices to retrieve data encrypted with the encryption key.

12. The system of claim 11, wherein the hardware controller configured to retrieve data encrypted with the key using the reconstructed encryption key.

13. The system of claim 11, wherein the key is a linear function of the shares.

14. The system of claim 11, wherein distributing the plurality of shares among the plurality of devices further comprising distributing the plurality of shares among k of the plurality of devices wherein k shares are required to define a polynomial of degree k−1.

15. The system of claim 11, wherein the hardware controller is further configured to distribute the plurality of shares among the plurality of devices further comprising distributing the plurality of shares among the plurality of devices based on Blakeley's scheme.

16. The system of claim 11, wherein the hardware controller is further configured to distribute shares of at least two PCBAs to a common cartridge so that each of the at least two PCBAs in combination with the common cartridge is able to reconstruct the encryption key.

17. One or more memory devices storing processor-readable instructions for executing a computer process, the computer process comprising:
    generating a plurality of shares of an encryption key;
    aggregating the plurality of shares used to access a secret to a combination of shared printed circuit board assemblies (PCBAs) and disc drive cartridges based on comparing the aggregation of plurality of shares received from the combination of shared PCBAs and disc drive cartridges with a threshold number, the threshold number providing a combination of a threshold number of disc drive cartridges and a threshold number of PCBAs, wherein aggregating the plurality of shares being an algebraic aggregation;
    distributing the plurality of shares among a plurality of devices, the plurality of devices including one or more of the disc drive cartridges and the PCBAs configured to host the one or more of the disc drive cartridges;
    receiving, at a hardware controller, one or more of the plurality of shares from the plurality of devices;
    in response to determining that the aggregation of the received one or more of the plurality of shares is above the threshold number, reconstructing the encryption key using the received one or more of the plurality of shares from the plurality of devices to retrieve data encrypted with the encryption key;
    retrieving the data encrypted with the key using the reconstructed encryption key.

18. The one or more memory devices of claim 17, wherein the key is a linear function of the shares.

19. The one or more memory devices of claim 17, wherein distributing the plurality of shares among the plurality of devices further comprising distributing the plurality of shares among at least k of the plurality of devices wherein k shares are required to define a polynomial of degree k−1.

* * * * *